US009337754B2

(12) United States Patent
Kitanaka (10) Patent No.: US 9,337,754 B2
(45) Date of Patent: May 10, 2016

(54) CONTROL APPARATUS FOR AC MOTOR (75) Inventor: Hidetoshi Kitanaka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/110,748

(22) PCT Filed: Apr. 18, 2011

(86) PCT No.: PCT/JP2011/059547
§ 371 (c)(1),
(2), (4) Date: Oct. 9, 2013

(87) PCT Pub. No.: WO2012/144000
PCT Pub. Date: Oct. 26, 2012

(65) Prior Publication Data
US 2014/0049197 A1   Feb. 20, 2014

(51) Int. Cl.
H02P 6/00      (2016.01)
H02P 21/04    (2006.01)
H02P 21/05    (2006.01)
(Continued)

(52) U.S. Cl.
CPC ............ *H02P 6/002* (2013.01); *B60L 11/1803* (2013.01); *B60L 15/025* (2013.01); *H02P 21/04* (2013.01); *H02P 21/05* (2013.01); *H02P 27/08* (2013.01); *B60L 2240/421* (2013.01); *B60L 2240/423* (2013.01); *B60L 2240/427* (2013.01); *B60L 2240/429* (2013.01); *H02P 2205/05* (2013.01); *Y02T 10/643* (2013.01); *Y02T 10/7005* (2013.01)

(58) Field of Classification Search
None
See application file for complete search history.

(56) References Cited

U.S. PATENT DOCUMENTS 8,106,620 B2     1/2012  Kitanaka
2004/0187835 A1*  9/2004  Hoff et al. ............ 123/196 R
(Continued)

FOREIGN PATENT DOCUMENTS

CN   101170294 A   4/2008
CN   101507100 A   8/2009
(Continued)

OTHER PUBLICATIONS

International Search Report (PCT/ISA/210) mailed on Jun. 28, 2011, by the Japanese Patent Office as the International Searching Authority for International Application No. PCT/JP2011/059547.
(Continued)

*Primary Examiner* — Bentsu Ro
*Assistant Examiner* — Cortez Cook
(74) *Attorney, Agent, or Firm* — Buchanan Ingersoll & Rooney PC (57) ABSTRACT A control apparatus for an AC motor that drives and controls the AC motor includes a damping control unit that calculates a damping manipulated variable that suppresses a fluctuation in the capacitor voltage, wherein the damping control unit calculates a fluctuation rate of the capacitor voltage, calculates the damping manipulated variable based on the fluctuation rate and a predetermined value that is set as a value in a predetermined range around a maximum torque of the AC motor, generates a torque command or a current command of the AC motor based on the damping manipulated variable, and controls an inverter so as to change a current flowing in the inverter in a fluctuation suppressing direction with respect to a fluctuation in the capacitor voltage based on the torque command or the current command.

7 Claims, 4 Drawing Sheets (51) Int. Cl.
  *H02P 27/08* (2006.01)
  *B60L 11/18* (2006.01)
  *B60L 15/02* (2006.01)

(56) References Cited

U.S. PATENT DOCUMENTS

| | | | |
|---|---|---|---|
| 2005/0264255 | A1 | 12/2005 | Maruyama et al. |
| 2006/0076840 | A1* | 4/2006 | Yamaguchi et al. ............ 310/53 |
| 2010/0237821 | A1* | 9/2010 | Kitanaka ................. H02P 21/05 318/702 |
| 2012/0063179 | A1* | 3/2012 | Gong et al. ..................... 363/40 |
| 2012/0101691 | A1* | 4/2012 | Otsuka et al. ................... 701/48 |

FOREIGN PATENT DOCUMENTS

| | | |
|---|---|---|
| CN | 101809857 A | 8/2010 |
| JP | 2005-341669 A | 12/2005 |
| JP | 4065901 B1 | 3/2008 |
| JP | 2009-290957 A | 12/2009 |

OTHER PUBLICATIONS

Written Opinion (PCT/ISA/237) mailed on Jun. 28, 2013, by the Japanese Patent Office as the International Searching Authority for International Application No. PCT/JP2011/059547.

Chinese Office Action with English translation corresponding to Chinese Patent Application No. 201180070213.6, dated May 11, 2015.

* cited by examiner

CONTROL APPARATUS FOR AC MOTOR

FIELD

The present invention relates to a control apparatus for an AC motor for driving and controlling an AC motor.

BACKGROUND

A technique for driving and controlling an AC motor using an inverter has been widely used in the industrial field. The technique is conventionally and widely used also in electrical railroads. However, it is known that in a case of applying the above system to a DC feeding electrical railroad, electrical oscillation occurs in a harmonic-absorption LC filter circuit arranged on the DC side of an inverter and constituted by a reactor and a capacitor, and a voltage across the capacitor (a capacitor voltage) oscillates, which makes a control over the motor unstable. A damping control method for suppressing this oscillation is disclosed in Patent Literature 1 mentioned below.

Patent Literature 1 mentioned below discloses a configuration that controls an inverter to have a positive resistance characteristic with respect to a fluctuation amount of a capacitor voltage Efc by configuring the control apparatus such that a torque command Tm* is multiplied by a damping manipulated variable that is a value obtained by squaring a fluctuation rate of the capacitor voltage Efc and suppresses the electrical oscillation of an LC filter circuit, thereby making a control over the motor stable.

CITATION LIST

Patent Literature

Patent Literature 1: Japanese Patent No. 4065901

SUMMARY

Technical Problem

However, with the above conventional technique, in order to change an inverter input power Pinv such that the inverter has a positive resistance characteristic, the torque command Tm* is multiplied by the damping manipulated variable. Accordingly, when the torque command Tm* is either zero or a small value close to zero, the damping manipulated variable becomes either zero or a small value close to zero, and it is impossible to change the inverter input power Pinv.

For example, when the torque command Tm* is zero, there are problems that it is impossible to manipulate the inverter input power Pinv using a damping manipulated variable DAMPCN, and the apparatus cannot exhibit a sufficient performance for suppressing the oscillation of the capacitor voltage Efc in a case where a disturbance such as a fluctuation in an overhead line voltage causes the oscillation of the capacitor voltage Efc.

The present invention has been achieved to solve the above problems, and an object of the present invention is to provide a control apparatus for an AC motor capable of suppressing electrical oscillation of an LC filter circuit even when the magnitude of a torque command Tm* is small or close to zero and thus is capable of stably driving and controlling the AC motor.

Solution to Problem

In order to solve the above problems and achieve the object, in the present invention, a control apparatus for an AC motor that drives and controls the AC motor via an inverter that includes an LC filter circuit, which includes a reactor and a capacitor, on a DC power supply side and converts a capacitor voltage that is a voltage across the capacitor to an AC voltage at an arbitrary frequency, includes a damping control unit that calculates a damping manipulated variable that suppresses a fluctuation in the capacitor voltage, wherein the damping control unit calculates a fluctuation rate of the capacitor voltage, calculates the damping manipulated variable based on the fluctuation rate and a predetermined value that is set as a value in a predetermined range around a maximum torque of the AC motor, generates a torque command or a current command of the AC motor based on the damping manipulated variable, and controls the inverter so as to change a current flowing in the inverter in a fluctuation suppressing direction with respect to a fluctuation in the capacitor voltage based on the torque command or the current command.

Advantageous Effects of Invention

According to the present invention, an effect is obtained where it is possible to suppress electrical oscillation of an LC filter circuit even when the magnitude of a torque command Tm* is small or close to zero and thus stably drive and control an AC motor.

DESCRIPTION OF EMBODIMENTS

Exemplary embodiments of a control apparatus for an AC motor according to the present invention will be explained below in detail with reference to the accompanying drawings. The present invention is not limited to the embodiments.

Embodiment

Figure 1:
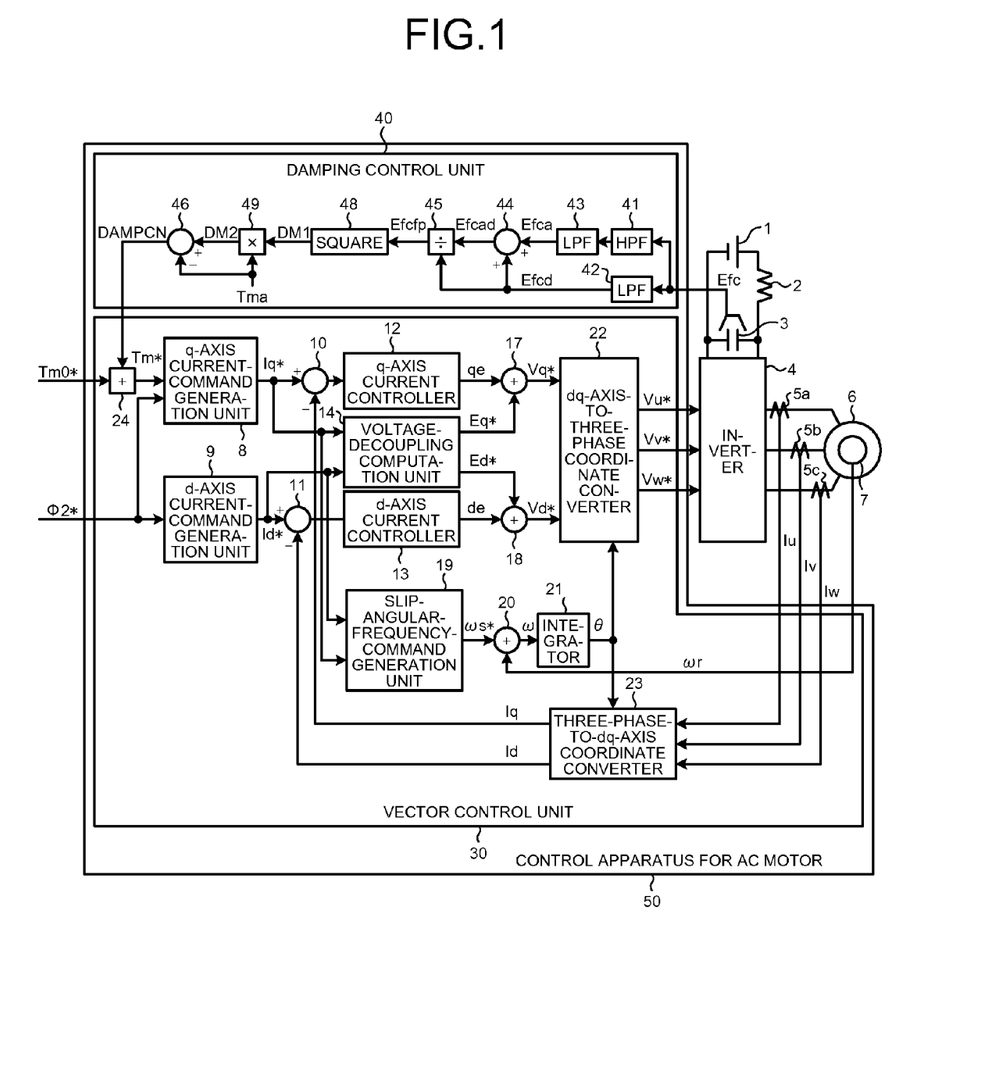
FIG. 1 is a block diagram illustrating an example of a configuration of an AC motor system according to an embodiment.

FIG. 1 is a block diagram illustrating an example of a configuration of an AC motor system according to the embodiment. As shown in FIG. 1, the AC motor system according to the present embodiment includes a DC power supply 1, an LC filter circuit constituted by a reactor 2 and a capacitor 3 for suppressing a harmonic current from flowing to a power supply side, an inverter 4 that converts a voltage (a capacitor voltage) Efc across the capacitor 3 to an AC voltage having an arbitrary frequency, an AC motor 6, and a control apparatus 50 for an AC motor that drives and controls the AC motor 6.

The control apparatus 50 for an AC motor is constituted by a vector control unit 30 and a damping control unit 40, and a signal ωr from a speed detector 7 that detects a rotational speed of the AC motor 6, signals Iu, Iv, and Iw from current detectors 5a to 5c that detect motor currents, respectively, and a voltage Efc across the capacitor 3 are input to the control apparatus 50. In the present embodiment, the AC motor system is configured to include the current detectors for three phases, respectively. Alternatively, it suffices that the AC motor system is configured to include the current detectors for at least two phases, respectively because a current in the remaining phase can be calculated by computation.

A speed sensor-less vector control system for computing and calculating a rotational speed of the AC motor 6 without providing the speed detector 7 is already put into practical use, in which case, it is unnecessary to provide the speed detector 7.

Furthermore, while the AC motor 6 is described below by referring to an example of a configuration that uses an induction motor as the AC motor 6, the damping control unit 40 disclosed in the present invention is also effective for a case of using a synchronous motor as the AC motor 6.

A configuration of the vector control unit 30 is described next. The vector control unit 30 controls the AC motor on a dq-axis rotating coordinate system, where an axis that matches an axis of a secondary magnetic flux of the AC motor 6 is defined as a d-axis and an axis orthogonal to the d-axis is defined as a q-axis. That is, the vector control unit 30 executes what is called a vector control.

The vector control unit 30 is configured such that a torque basic command Tm0* and a secondary magnetic flux command φ2* that are generated by a high-level control unit (not shown) and the U-phase current Iu, the V-phase current Iv, and the W-phase current Iw detected by the current detectors 5a to 5c, respectively are input to the vector control unit 30. The vector control unit 30 performs a control such that a torque Tm generated by the AC motor 6 matches a torque command Tm* generated from the torque basic command Tm0* (a generating method therefor is described later).

Configurations of respective functional blocks in the vector control unit 30 are described next. A q-axis current-command generation unit 8 and a d-axis current-command generation unit 9 compute a d-axis (excitation amount) current command Id* and a q-axis (torque amount) current command Iq* from the torque command Tm* obtained by adding a damping manipulated variable DAMPCN (described later) to the torque basic command Tm0* input from an external control unit (not shown), the secondary magnetic flux command φ2*, and circuit constants of the AC motor 6, as expressed by the following Equations (1) and (2), respectively. In Equations (1) and (2), L2 indicates a secondary self-inductance of the motor and is expressed as L2=M+l2. M indicates a mutual inductance, l2 indicates a secondary leakage inductance, s indicates a differential operator, PP indicates the number of pole pairs of the AC motor 6, and R2 indicates a secondary resistance of the AC motor 6.

$$Iq^* = (Tm^*/(\phi 2^* \cdot PP)) \cdot (L2/M) \tag{1}$$

$$Id^* = \phi 2^*/M + L2/(M \cdot R2) \cdot s\phi 2^* \tag{2}$$

A slip-angular-frequency-command generation unit 19 computes a slip angular frequency command ωs* to be supplied to the AC motor 6 from the d-axis current command Id*, the q-axis current command Iq*, and the circuit constants of the AC motor 6, as expressed by the following Equation (3).

$$\omega s^* = (Iq^*/Id^*) \cdot (R2/L2) \tag{3}$$

An adder 20 adds the slip angular frequency command ωs* calculated by the Equation (3) to the rotational angular frequency ωr output from the speed detector 7 attached to an axial end of the AC motor 6, and outputs an addition result as an inverter angular frequency ω to be output from the inverter 4. An integrator 21 integrates the inverter angular frequency ω to generate a phase angle θ for coordinate conversion, and inputs the phase angle θ to a dq-axis-to-three-phase coordinate converter 22 and a three-phase-to-dq-axis coordinate converter 23.

The three-phase-to-dq-axis coordinate converter 23 converts the U-phase current Iu, the V-phase current Iv, and the W-phase current Iw detected by the respective current detectors 5a to 5c to a d-axis current Id and a q-axis current Iq on the dq coordinates calculated by the following Equation (4).

$$\begin{pmatrix} Iq \\ Id \end{pmatrix} = \sqrt{\frac{2}{3}} \begin{pmatrix} \cos\theta & \cos\left(\theta - \frac{2}{3}\pi\right) & \cos\left(\theta + \frac{2}{3}\pi\right) \\ \sin\theta & \sin\left(\theta - \frac{2}{3}\pi\right) & \sin\left(\theta + \frac{2}{3}\pi\right) \end{pmatrix} \cdot \begin{pmatrix} Iu \\ Iv \\ Iw \end{pmatrix} \tag{4}$$

A subtracter 10 subtracts the q-axis current Iq from the q-axis current command Iq* and inputs a subtraction result to a q-axis current controller 12 arranged on a next stage. The q-axis current controller 12 executes a proportional-plus-integral control over the input value and outputs a q-axis voltage compensation value qe. A subtracter 11 subtracts the d-axis current Id from the d-axis current command Id* and inputs a subtraction result to a d-axis current controller 13 arranged on a next stage. The d-axis current controller 13 performs a proportional-plus-integral amplification on the input value and outputs a d-axis voltage compensation value de.

The q-axis current error qe and the d-axis current error de are expressed by the following Equations (5) and (6), respectively.

In the following equations, s indicates a differential operator, K1 indicates a proportional gain, and K2 indicates an integral gain.

$$qe = (K1 + K2/s) \cdot (Iq^* - Iq) \tag{5}$$

$$de = (K1 + K2/s) \cdot (Id^* - Id) \tag{6}$$

A voltage-decoupling computation unit 14 computes a d-axis feedforward voltage Ed* and a q-axis feedforward voltage Eq* from the d-axis current command Id*, the q-axis current command Iq*, and the circuit constants of the AC motor 6, as expressed by the following Equations (7) and (8), respectively.

In Equations (7) and (8) described above, σ indicates a leakage coefficient defined as σ=1−M²/(L1·L2). Furthermore, L1 indicates a primary self-inductance of the motor and is calculated as L1=M+l1. L2 indicates a secondary self-inductance of the motor and is calculated as L2=M+l2. l1 indicates a primary leakage inductance and l2 indicates a secondary leakage inductance.

$$Ed^* = -\omega \cdot L1 \cdot \sigma \cdot Iq^* + (M/L2) \cdot s\phi 2^* \tag{7}$$

$$Eq^* = \omega \cdot L1 \cdot \sigma \cdot Id^* + (\omega \cdot M \cdot \phi 2)/L2 \tag{8}$$

An adder 17 is configured to obtain a q-axis voltage command Vq* by adding the q-axis voltage compensation value qe to the q-axis feedforward voltage Eq* and input the q-axis voltage command Vq* to the dq-axis-to-three-phase coordinate converter 22. An adder 18 is configured to obtain a d-axis voltage command Vd* by adding the d-axis voltage compensation value de to the d-axis feedforward voltage Ed* and input the d-axis voltage command Vd* to the dq-axis-to-three-phase coordinate converter 22.

The q-axis voltage command Vq* and the d-axis voltage command Vd* are expressed by the following Equations (9) and (10), respectively.

$$Vq^* = Eq^* + qe \quad (9)$$

$$Vd^* = Ed^* + de \quad (10)$$

Finally, the dq-axis-to-three-phase coordinate converter 22 generates voltage commands Vu*, Vv*, and Vw* for the three phases from the q-axis voltage command Vq* and the d-axis voltage command Vd*, and controls the inverter 4.

In this way, the vector control unit 30 executes a vector control to which a current feedback control is added so that a q-axis current Iq and a d-axis current Id, which are actual currents of the AC motor 6, match the q-axis current command Iq* and the d-axis current command Id*, which are calculated from the torque command Tm* and the secondary magnetic flux command φ2*, respectively, whereby the AC motor 6 outputs a torque Tm matching the torque command Tm* and then rotates. The control operation described above is not explained in detail because it is basically identical to a well-known vector control.

A configuration of the damping control unit 40 that is a main part of the present invention is described next. Before starting a specific description of the damping control unit 40 shown in FIG. 1, an explanation is briefly made of the cause of the electrical oscillation of the LC filter circuit and an electrical-oscillation suppression principle of the LC filter circuit that forms the basis of the configuration of the damping control unit shown in the first embodiment of the present invention.

Figure 2:
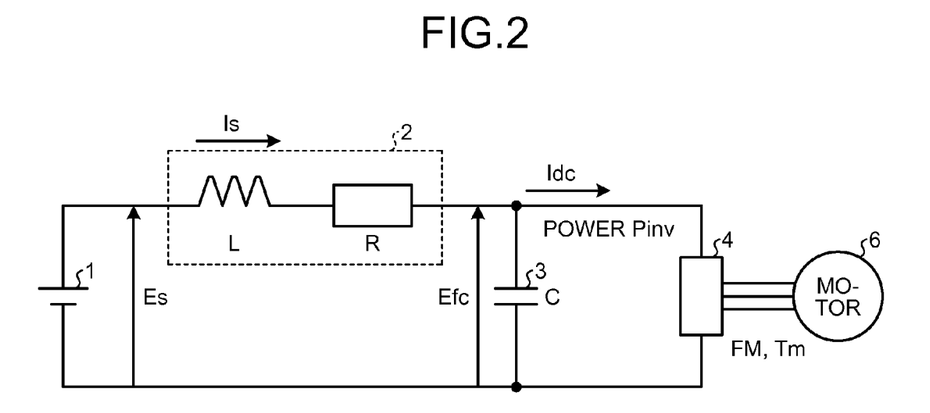
FIG. 2 is an explanatory diagram illustrating an example of a circuit in which a constant-power-controlled inverter is connected to an LC filter connected to a DC power supply.

FIG. 2 is a diagram illustrating a circuit in which the constant-power-controlled inverter 4 is connected to the LC filter connected to the DC power supply 1. FIG. 2 expresses the system shown in FIG. 1 in a simplified manner.

As shown in FIG. 2, the configuration is such that the LC filter circuit constituted by the reactor 2 and the capacitor 3 is connected to the DC power supply 1 and the inverter 4 that drives and controls the AC motor 6 is connected to the capacitor 3. The reactor 2 is constituted by an inductance part L and a resistance part R. An electrostatic capacity of the capacitor 3 is C.

The inverter 4 is configured to be controlled such that an output from the AC motor 6 is kept constant even if the capacitor voltage Efc fluctuates, that is, a constant power characteristic is obtained with respect to a fluctuation in the capacitance voltage Efc. That is, the inverter 4 is controlled such that an input power Pinv input to the inverter 4 does not change even if the Efc fluctuates.

In the system shown in FIG. 2 configured as described above, the inverter 4 viewed from a side of the DC power supply 1 has a negative resistance characteristic. The negative resistance characteristic refers to a characteristic that an inverter input current Idc decreases as the capacitor voltage Efc increases and that the inverter input current Idc increases as the capacitor voltage Efc decreases. The negative resistance characteristic is opposite to a normal resistance (a positive resistance) in a current change relative to a voltage change. It is known as common knowledge that the normal resistance (the positive resistance) is that a current increases as a voltage increases and that a current decreases as a voltage decreases.

As described above, a DC part of the system shown in FIG. 2 exhibits the negative resistance characteristic and operates to accelerate increasing the capacitor voltage Efc because the inverter input current Idc decreases as the capacitor voltage Efc increases. Conversely, the DC part operates to accelerate decreasing the capacitor voltage Efc because the inverter input current Idc increases as the capacitor voltage Efc decreases. Accordingly, the system is unable to damp the fluctuation in the capacitor voltage Efc, with the result that the electrical oscillation of the LC filter circuit expands and that the capacitor voltage Efc keeps oscillating at a frequency near a resonance frequency of the LC filter. The above description is a qualitative explanation.

Next, the phenomenon described above is described quantitatively by obtaining and evaluating a transfer function of the system shown in FIG. 2. First, a transfer function from a DC voltage Es to the capacitor voltage Efc is obtained from the system shown in FIG. 2.

As described above, the inverter 4 is controlled to have a constant output. In this case, a relational expression among the inverter input power Pinv, the capacitor voltage Efc, and the inverter input current Idc is expressed by the following Equation (11).

$$Efc \cdot Idc = Pinv (= \text{constant}) \quad (11)$$

The above relation is nonlinear, so that the relation is linearized. Assuming that operating points in that case are Efc0 and Idc0, the following Equation (12) is established near the operating points.

$$Idc = -\frac{Pinv \cdot (Efc - Efc0)}{Efc0^2} + Idc0 \quad (12)$$

Figure 3:
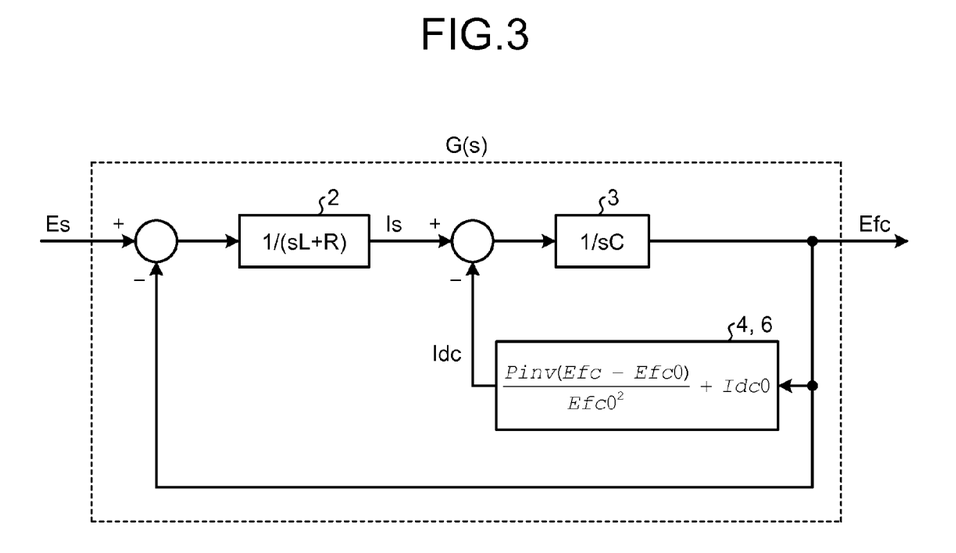
FIG. 3 is a diagram illustrating a transfer function block of a system shown in FIG. 2.

From FIG. 2 and the Equation (12), a block diagram of the transfer function of the system shown in FIG. 2 becomes as shown in FIG. 3. From the block diagram of the transfer function shown in FIG. 3, a closed-loop transfer function G(s) from the DC voltage Es to the capacitor voltage Efc is expressed by the following Equation (13).

$$G(s) = \frac{\frac{1}{C \cdot L}}{s^2 + \left(\frac{R}{L} - \frac{Pinv}{C \cdot Efc0^2}\right) \cdot s - \frac{1}{C \cdot L}\left(\frac{R \cdot Pinv}{Efc0^2} - 1\right)} \quad (13)$$

To ensure that this transfer function G(s) is stable, it is necessary for all poles of the G(s) to be negative. That is, it is necessary that solutions of a characteristic equation shown in the following Equation (14) that is a denominator of the G(s) are all negative.

$$s^2 + \left(\frac{R}{L} - \frac{Pinv}{C \cdot Efc0^2}\right) \cdot s - \frac{1}{C \cdot L}\left(\frac{R \cdot Pinv}{Efc0^2} - 1\right) = 0 \quad (14)$$

Assuming that the solutions of the above equation are α and β, it is necessary that the both are negative. Therefore, as conditions for making the G(s) stable, it is possible to derive the following Equations (15) and (16). The following Equations (15) and (16) can be derived from a relation between the solutions and coefficients.

$$\alpha + \beta = -\left(\frac{R}{L} - \frac{Pinv}{C \cdot Efc0^2}\right) < 0 \quad (15)$$

$$\alpha \cdot \beta = -\frac{1}{C \cdot L}\left(\frac{R \cdot Pinv}{Efc0^2} - 1\right) > 0 \quad (16)$$

The Equation (16) is ignored here because it does not include useful information. The Equation (15) is rewritten into the following Equation (17).

$$R > \frac{L}{C} \cdot \frac{Pinv}{Efc0^2} \quad (17)$$

The Equation (17) indicates that the R necessary to stabilize the system can be low as the L is smaller, the C is greater, the Pinv is lower, and the Efc0 is higher. For example, when conditions of L=12 mH, C=6600 μF, Pinv=1000 KW, and Efc0=1500 V that are general values in an inverter system for driving an electric vehicle are assigned to the Equation (17), a value of the R that can stabilize the system is R>0.8 (Ω).

However, because a resistance component present on the DC side is generally as very low as about several tens of mΩ, it is difficult to satisfy the Equation (17). Accordingly, the system becomes unstable and oscillation occurs in the LC filter circuit. That is, it can be understood that the capacitor voltage Efc oscillates and diverges unless a resistor satisfying the Equation (17) is added to the circuit shown in FIG. 2 or the system is controlled to become stable.

In practice, the addition of the resistor makes the apparatus large in size and increases loss. Therefore, it is necessary to adopt a method of controlling the system and a specific conventional method is as disclosed in Patent Literature 1.

Figure 4:
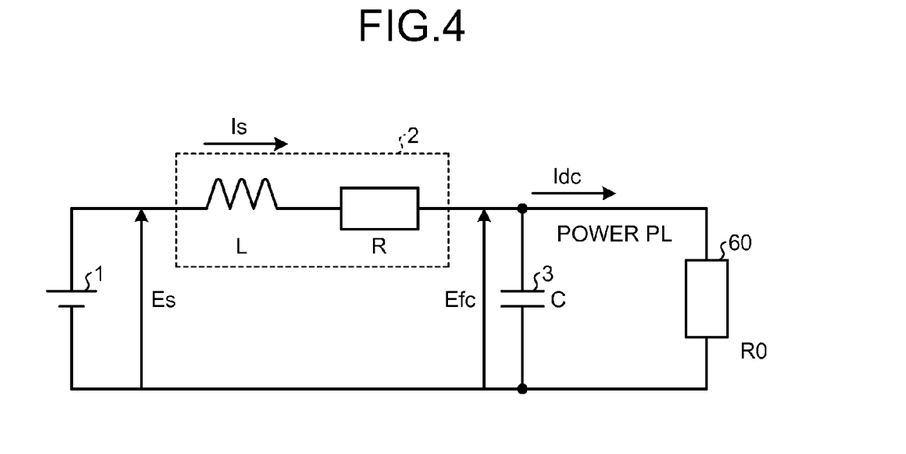
FIG. 4 is an explanatory diagram illustrating an example of a circuit in which a load constituted by a resistor is connected to an LC filter connected to a DC power supply.

A case where a load is a resistance (a normal positive resistance) load is described quantitatively similarly to the above. FIG. 4 is a diagram illustrating a circuit in which a load constituted by a resistor 60 is connected to the LC filter connected to the DC power supply 1. As compared with the circuit shown in FIG. 2, the circuit shown in FIG. 4 is such that the inverter 4 and the AC motor 6 are replaced by the resistor 60. A resistance value of the resistor 60 is defined as R0.

Figure 5:
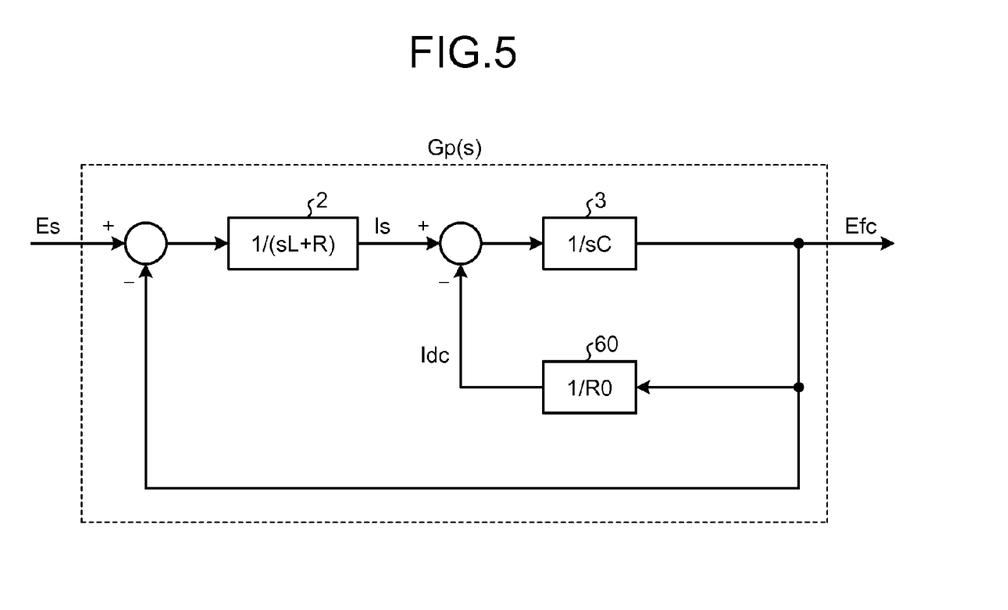
FIG. 5 is a diagram illustrating a transfer function block of a system shown in FIG. 4.

A block diagram of a transfer function of the system shown in FIG. 4 is as shown in FIG. 5. From FIG. 5, a closed-loop transfer function Gp(s) from the voltage Es of the DC power supply 1 to the capacitor voltage Efc is expressed by the following Equation (18).

$$Gp(s) = \frac{\frac{1}{C \cdot L}}{s^2 + \left(\frac{1}{C \cdot R0} + \frac{R}{L}\right) \cdot s + \frac{1}{C \cdot L} \cdot \left(\frac{R}{R0} + 1\right)} \quad (18)$$

A characteristic equation of the closed-loop transfer function Gp(s) expressed by the Equation (18) is expressed by the following Equation (19).

$$s^2 + \left(\frac{1}{C \cdot R0} + \frac{R}{L}\right) \cdot s + \frac{1}{C \cdot L} \cdot \left(\frac{R}{R0} + 1\right) = 0 \quad (19)$$

Because of R>0, the conditions that solutions of the characteristic equation expressed by the Equation (19) are all negative are always satisfied. This indicates that the case where the load is constituted by the resistor 60 ensures that the system is always stable.

In FIG. 4, when the resistance R of the reactor 2 is ignored, it is impossible to suppress the oscillation and the system reaches a stability limit because of no power loss in the system when the resistance value of the resistor 60 is zero. Accordingly, once oscillation occurs due to a disturbance such as a fluctuation in the power supply voltage, it is impossible to suppress the oscillation and the LC filter circuit keeps oscillating. Furthermore, it is known that the system becomes more stable as the resistance value of the resistor 60 is lower, that is, the power (a positive resistance component) consumed by the resistor 60 is higher.

As described above, it is understood that the circuit in which the resistor 60 is connected to the LC filter connected to the DC power supply 1 is always stable. The present invention pays attention to this principle and is characterized in that the inverter 4 is controlled such that the inverter 4 has a characteristic equivalent to a characteristic exhibited in a case of connecting the resistor 60 to the LC filter circuit with respect to an oscillation component of the capacitor voltage Efc.

A characteristic of the circuit in which the resistor 60 is connected to an output of the LC filter shown in FIG. 4 is described below. In the circuit of FIG. 4, assuming that the current Idc flows to the resistor 60 at the capacitor voltage Efc, power PR consumed by the resistor 60 is expressed by the following Equation (20).

$$PR = Efc \cdot Idc \quad (20)$$

When the capacitor voltage Efc fluctuates to increase to n times as high as an initial value, the current Idc flowing to the resistor 60 similarly becomes n times as high as an initial value. Therefore, the power PRn consumed by the resistor 60 at this time is expressed by the following Equation (21).

$$PRn = n \cdot Efc \cdot n \cdot Idc = n^2 \cdot Efc \cdot Idc = n^2 \cdot PR \quad (21)$$

That is, it is found that the power PRn consumed by the resistor 60 is proportional to the square of a change rate of the capacitor voltage Efc.

This indicates that the inverter 4 can be operated to have a positive resistance characteristic with respect to the fluctuation in the capacitor voltage Efc by controlling the inverter 4 to satisfy the relation of the Equation (21).

The output from the AC motor 6 is expressed by (a rotational frequency FM of the AC motor 6)×(the output torque Tm) and, when loss is ignored, this is equal to the input power Pinv of the inverter 4. Therefore, the following Equation (22) is established.

$$Pinv = FM \cdot Tm \quad (22)$$

To control the inverter 4 to operate to have a positive resistance characteristic with respect to the fluctuation in the capacitor voltage Efc, it suffices that power Pinvn in a case where the capacitor voltage Efc is n times as high as the initial value satisfies the relation of the following Equation (23) similarly to the Equation (21).

$$Pinvn = n^2 \cdot Pinv = n^2 \cdot FM \cdot Tm \quad (23)$$

In this Equation, the rotational frequency FM of the AC motor 6 is a value that changes depending on the speed of an electric vehicle. On the other hand, the resonance frequency of the LC filter circuit dealt with by the damping control unit 40 is 10 Hz to 20 Hz and converted to a cycle of 50 ms to 100 ms in time. Consequently, it can be considered that an oscillation cycle of the LC filter circuit is sufficiently short as compared with a change in the speed of the electric vehicle. Therefore, in the case of considering the configuration of the damping control unit 40, it can be assumed that the rotational frequency FM of the AC motor 6 is constant.

Therefore, the inverter input power Pinv can be changed proportionally to the square of the change rate of the capacitor voltage Efc by controlling the inverter 4 so as to multiply the torque Tm of the AC motor 6 by $n^2$ when the capacitor voltage Efc becomes n times as high as the initial value. With this configuration, it is possible for the inverter 4 to have a positive resistance characteristic with respect to the fluctuation amount in the capacitor voltage Efc, to suppress the electrical oscillation of the LC filter circuit, and to stabilize the system.

Therefore, from the Equations (22) and (23), a change amount $\Delta P$ of the inverter input power to be added for the stabilization in the case where the capacitor voltage Efc becomes n times as high as the initial value at the torque command of Tm* can be expressed by the following Equation (24).

$$\Delta P = Pinvn - Pinv = n^2 \cdot FM \cdot Tm^* - FM \cdot Tm^* \quad (24)$$

A torque-command change amount $\Delta Tm^*$ to be added that is necessary to obtain the change amount $\Delta P$ of the inverter input power expressed by the Equation (24) is expressed by the following Equation (25).

$$\Delta Tm^* = \Delta P/FM = (n^2 - 1) \cdot Tm^* \quad (25)$$

Consequently, the inverter 4 can be made to have a positive resistance characteristic and the system can be stabilized by controlling the inverter 4 by adding the torque-command change amount $\Delta Tm^*$ to the torque command Tm*. However, because a positive resistance amount decreases as the torque command Tm* is smaller, an effect of suppressing the oscillation of the capacitor voltage Efc is decreased in a case where the torque command Tm* is small as compared with a case where the torque command Tm* is sufficiently large (for example, a case where the torque command Tm* is a rated torque or a maximum torque).

For example, when the torque command Tm* is zero or a value close to zero, the $\Delta Tm^*$ (that is, $\Delta P$) becomes zero or a value close to zero based on the Equation (25). As a result, the inverter input power Pinv cannot be changed. Accordingly, it is difficult to suppress the electrical oscillation in a case where the electrical oscillation of the capacitor voltage Efc occurs due to an external factor such as a fluctuation in an overhead line voltage.

In the present embodiment, the configuration is such that even when the torque command Tm* is zero, it is possible to obtain a change amount $\Delta Pa$ of the inverter input power similar to that in a case where the torque command Tm* is a value equal to or larger than a certain level (Tm*=Tma).

From the Equations (24) and (25), the change amount $\Delta Pa$ of the inverter input power to be added for the stabilization in the case where the capacitor voltage Efc becomes n times as high as the initial value at the torque command of Tm*=Tma can be expressed by the following Equation (26).

$$\Delta Pa = Pinvn - Pinv = n^2 \cdot FM \cdot Tma - FM \cdot Tma \quad (26)$$

A torque-command change amount $\Delta Tma^*$ to be added, necessary to obtain the change amount $\Delta Pa$ of the inverter input power expressed by the Equation (26) is expressed by the following Equation (27).

$$\Delta Tma^* = \Delta Pa/FM = (n^2 - 1) \cdot Tma \quad (27)$$

Consequently, it is possible to obtain the change amount $\Delta Pa$ of the inverter input power similar to that in a case where the torque command Tm* is a value equal to or larger than a certain level (Tm*=Tma) with respect to the fluctuation in the capacitor voltage Efc irrespective of the magnitude of the torque command Tm* by controlling the inverter 4 while adding the torque command change amount $\Delta Tma^*$ to the torque command Tm*. With this configuration, it is possible to suppress the electrical oscillation even when the electrical oscillation of the capacitor voltage Efc occurs due to the external factor such as a fluctuation in the overhead line voltage at the time the torque command Tm* is equal to or close to zero.

The value Tma used in the Equation (27) and the like is preferably set to a value corresponding to a value closer to the maximum torque of the AC motor 6 that is a control target. For example, it suffices to set the value Tma to the maximum torque of the AC motor 6 or a large value equal to or smaller than the maximum torque (such as a rated torque (generally equal to or higher than 50% of the maximum torque) or a starting torque (generally equal to the maximum torque)). When the maximum torque of the AC motor 6 is, for example, 1500 Nm, the value Tma is preferably set to 1500 or a value that is as large as possible and smaller than 1500. A small value Tma is not preferable because the effect of suppressing the electrical oscillation is decreased as can be understood from the above explanation. When the value Tma is far larger than the maximum torque of the AC motor 6 (equal to or larger than 200% of the maximum torque, for example), the change amount of the torque command Tm* becomes extremely large, resulting in an unstable operation. The value Tma may be set larger than the maximum torque in a range in which the value Tma is not far larger than the maximum torque. According to a result of a simulation conducted by the inventor, the value Tma preferably falls in the range from 50% to 200% of the maximum torque of the AC motor 6.

Figure 6:
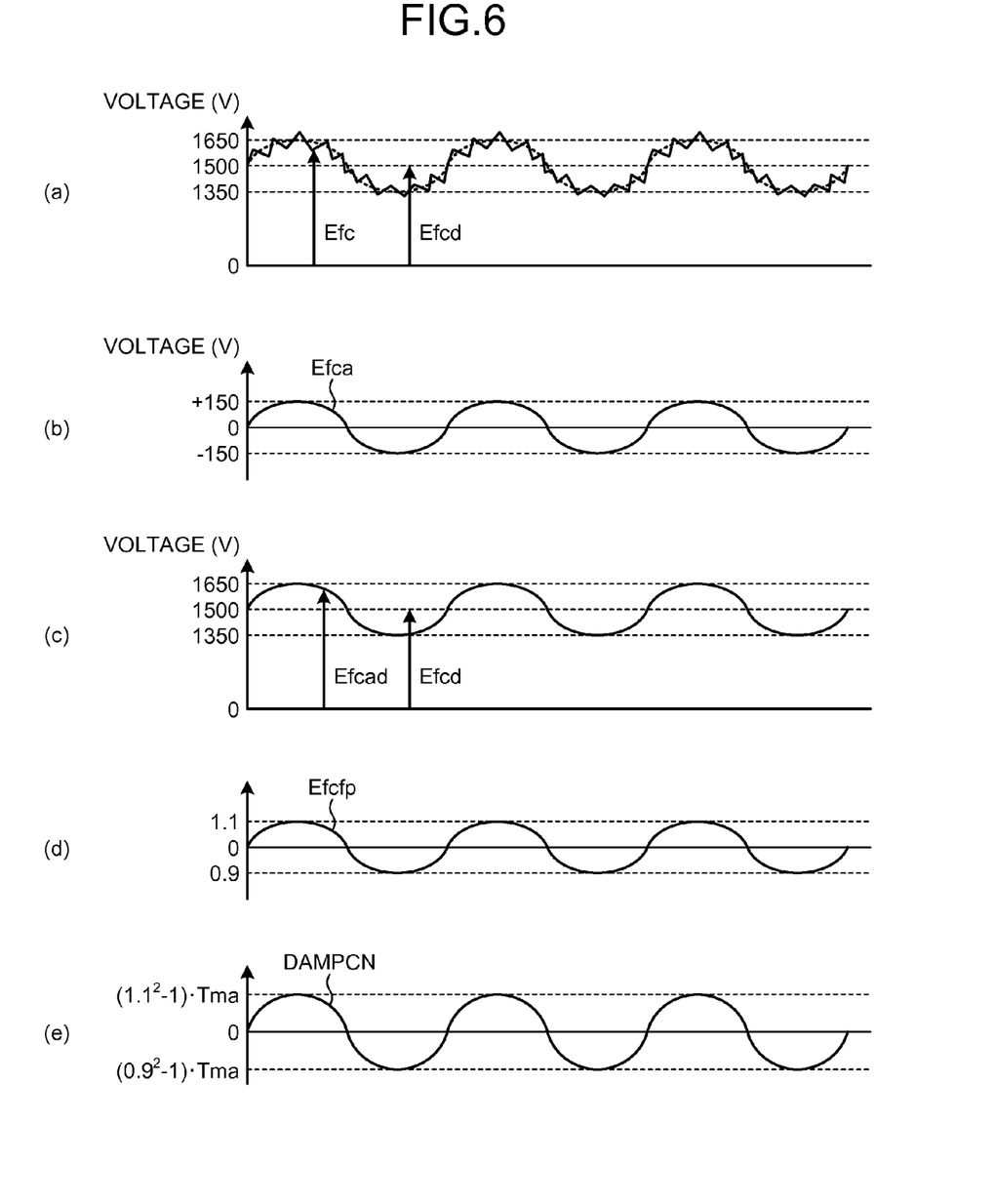
FIG. 6 is a diagram explaining a relation among signals of respective parts of a damping control unit.

A specific configuration of the method described above is described next with reference to FIGS. 1 and 6. FIG. 6 is a diagram explaining a relation among signals within the damping control unit 40 according to the first embodiment of the present invention.

The voltage Efc across the capacitor 3 is input to the damping control unit 40 and branched off into two systems therein. On one hand, a high-pass filter (hereinafter, an "HPF") 41 and a low-pass filter (hereinafter, an "LPF") 43 cut off unnecessary high frequency components and unnecessary low frequency components, and calculate an oscillation component Efca that is only a component extracted near the resonance frequency of the LC filter circuit. For example, when the capacitor voltage Efc oscillates around 1500 V from 1650 V to 1350 V as shown in FIG. 6(a), the Efca is the signal that fluctuates in the same phase as that of the oscillation component of the capacitor voltage Efc in a range from +150 V to −150 V as shown in FIG. 6(b).

On the other hand, an LPF 42 extracts only a DC component as a DC component Efcd. The HPF 41, the LPF 42, and the LPF 43 are primary filters constituted by first order lag elements, and a configuration of each of which is not described here because the configuration is well known. Obviously, although second or higher order filters may be used, the configurations of the filters become complicated.

Mechanisms of the HPF 41 and the LPF 43 are described. The reason for the need of the LPF 43 is to remove the high frequency components that are contained in the capacitor voltage Efc and become a disturbance to the control system. However, a lower limit of the high frequency components to be removed is several hundred Hz and is close to a resonance frequency band (generally about 10 to 20 Hz) of the LC filter that is a damping control target. Accordingly, when the high frequency components are removed using only the LPF 43, even resonance frequency components of the LC filter contained in the oscillation component Efca are affected and a phase lag is caused in the resonance frequency components, which is not preferable.

The HPF 41 is additionally connected to the LPF 43 in series and a filter is configured by a combination of the HPF 41 and the LPF 43. This can improve the phase lag in the resonance frequency components of the LC filter contained in the oscillation component Efca while ensuring a similar high-frequency-component removal characteristic to that in a case of using the LPF 43 solely. It is desirable that characteristics of the HPF 41 and the LPF 43 are such that a frequency at which a gain becomes one is made to match the resonance frequency (10 Hz to 20 Hz) of the LC filter circuit.

An adder 44 adds the DC component Efcd to the oscillation component Efca calculated as described above and an addition result is defined as a filtered capacitor voltage Efcad (FIG. 6(c)). Further, a divider 45 divides the filtered capacitor voltage Efcad by the DC component Efcd, thereby calculating a fluctuation rate Efcfp of the capacitor voltage Efc. The Efcfp is input to a square computation unit 48.

The square computation unit 48 squares the fluctuation rate Efcfp of the capacitor voltage Efc and outputs a calculation result to a multiplier 49 as a signal DM1. The multiplier 49 multiplies the signal DM1 by the value Tma and outputs a signal DM2 that is a multiplication result to a subtracter 46. The subtracter 46 subtracts the value Tma from the signal DM2 and outputs a subtraction result to the vector control unit 30 as the damping manipulated variable DAMPCN (FIG. 6(e)). Finally, an adder 24 of the vector control unit 30 adds the damping manipulated variable DAMPCN to the torque basic command Tm0*, and the vector control unit 30 executes the vector control using the torque command Tm* that is an addition result.

By executing a vector control using the torque command Tm* generated as described above, the inverter 4 can be controlled to operate to have a positive resistance characteristic with respect to the fluctuation in the capacitor voltage Efc and the oscillation of the capacitor voltage Efc can be suppressed. Furthermore, it is possible to obtain the change amount ΔPa of the inverter input power similar to that in a case where the torque command Tm* is a value equal to or larger than a certain level (Tm*=Tma) with respect to the fluctuation in the capacitor voltage Efc irrespective of the magnitude of the torque command Tm*. Accordingly, even in a case where an electrical oscillation of the capacitor voltage Efc occurs due to an external factor such as a fluctuation in the overhead line voltage at the torque command Tm* that is either equal to zero or a small value, it is possible to suppress the electrical oscillation. Therefore, it is possible to suppress the electrical oscillation of the LC filter circuit and to ensure that the AC motor 6 operates stably.

As described above, according to the present embodiment, the damping control unit that automatically calculates an optimum damping manipulated variable DAMPCN and dispenses with gain settings can be configured. Furthermore, because the constants of the AC motor 6 are not used in the calculation of the damping manipulated variable DAMPCN, there is no need to adjust the control system even when the type of the AC motor 6 changes.

An example of a case of using the induction motor as the AC motor 6 has been explained above. However, the configuration of the damping control unit and a method of calculating the damping manipulated variable described above can be also applied to the vector control unit in a case of using the above motor or another AC motor.

In the configuration according to the present embodiment, the damping manipulated variable DAMPCN is added to the torque basic command Tm0*. Alternatively, even when the damping manipulated variable DAMPCN is added to the q-axis current command Iq* synonymous with the torque command, similar effects can be obtained. In a case of adding the DAMPCN to the q-axis current command Iq*, it is necessary to convert a torque command-based value to a q-axis current command-based value using the Equation (1) before the addition.

Specifically, it suffices that DAMPCNIQ is calculated from the DAMPCN as expressed by the following Equation (28) and is added to the q-axis current command Iq*, and that an addition result is configured as a new q-axis current command Iq*.

$$DAMPCNIQ = (DAMPCN/(\phi 2^* \cdot PP)) \cdot (L2/M) \quad (28)$$

In the configuration according to the present invention, there is no need to switch the damping manipulated variable during power running and regenerative running of the AC motor 6, thereby making it possible to simplify the control system.

Furthermore, in the configuration according to the present invention, it is only the value Tma that is a set value necessary in a process of calculating the damping manipulated variable as described above. The value Tma is a value that can be easily grasped from specifications of the AC motor 6 to be used. Therefore, there is no need to derive setting gains or the like for a simulation or an actual object adjustment operation at the time of designing the damping control, thereby making it possible to simplify an adjustment operation of the control system.

The configuration described in the above embodiment is only an example of the contents of the present invention. The configuration can be combined with other well-known techniques, and it is obvious that the present invention can be configured while modifying it without departing from the scope of the invention, such as omitting a part of the configuration.

Furthermore, the present invention is not limited to a control apparatus for an AC motor for electrical railroads, and it is obvious that the present invention is applicable to various related fields.

REFERENCE SIGNS LIST

1 DC power supply
2 reactor
3 capacitor
4 inverter
5a to 5c current detector
6 AC motor
7 speed detector
8 q-axis current-command generation unit
9 d-axis current-command generation unit
10, 11 subtracter
12 q-axis current controller
13 d-axis current controller
14 voltage-decoupling computation unit
17, 18 adder
19 slip-angular-frequency-command generation unit
20 adder
21 integrator
22 dq-axis-to-three-phase coordinate converter
23 three-phase-to-dq-axis coordinate converter
24 adder
30 vector control unit
40 damping control unit
41 high-pass filter 42 low-pass filter
43 low-pass filter
44 adder
45 divider
46 subtracter
48 square computation unit
49 multiplier
50 control apparatus for AC motor
60 resistor

The invention claimed is:

1. A control apparatus for an AC motor that drives and controls the AC motor via an inverter that includes an LC filter circuit, which includes a reactor and a capacitor, on a DC power supply side and converts a capacitor voltage to an AC voltage, the apparatus comprising a damping control unit that calculates a fluctuation rate of the capacitor voltage and calculates a damping manipulated variable that suppresses a fluctuation in the capacitor voltage based on a value obtained by subtracting a preset predetermined value from a product of a signal that is a square of the fluctuation rate and the predetermined value, wherein a torque command or a current command of the AC motor is generated based on the damping manipulated variable, and the inverter is controlled based on the torque command or the current command.

2. The control apparatus for an AC motor according to claim 1, wherein the predetermined value is selected in a range from 50% to 200% of the maximum torque of the AC motor.

3. The control apparatus for an AC motor according to claim 1, wherein the predetermined value is the maximum torque of the AC motor.

4. The control apparatus for an AC motor according to claim 1, wherein the predetermined value is a rated torque of the AC motor.

5. The control apparatus for an AC motor according to claim 1, wherein the damping control unit calculates the fluctuation rate of the capacitor voltage by dividing the input capacitor voltage by a DC component contained in the capacitor voltage.

6. The control apparatus for an AC motor according to claim 1, wherein the damping control unit calculates the fluctuation rate of the capacitor voltage by dividing a signal obtained by adding a signal obtained by cutting off an unnecessary high frequency component contained in the capacitor voltage to a DC component contained in the capacitor voltage by the DC component contained in the capacitor voltage.

7. The control apparatus for an AC motor according to claim 1, wherein the preset predetermined value is a value in a predetermined range around a maximum torque of the AC motor.

* * * * *